United States Patent Office 2,745,435
Patented May 15, 1956

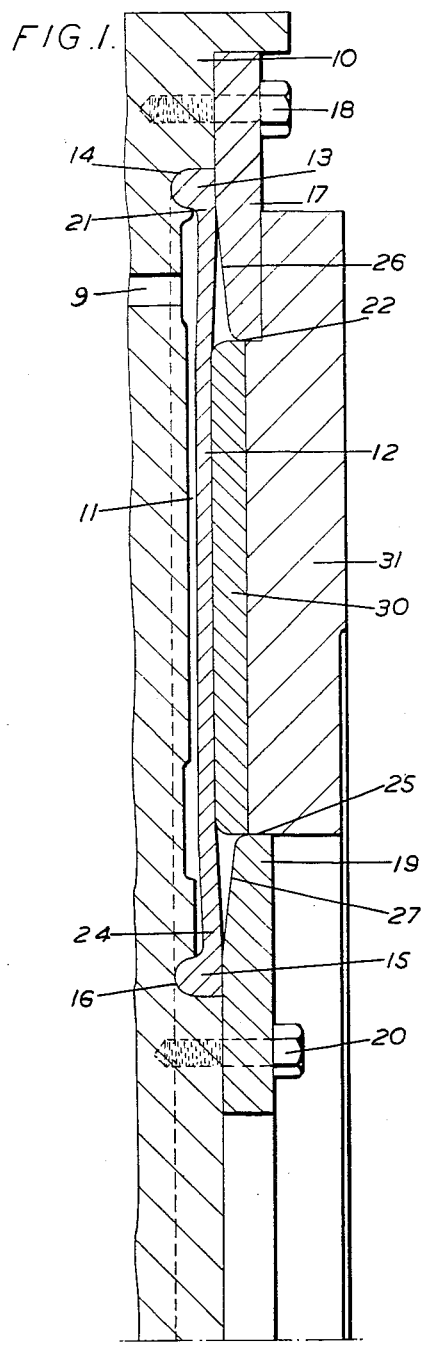
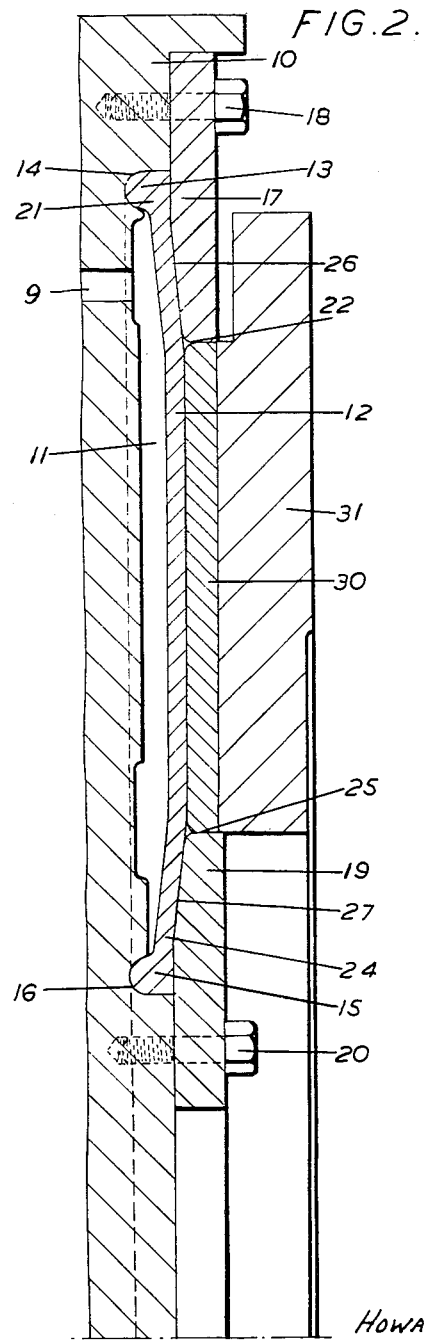

2,745,435
HYDRAULICALLY ACTUATED RING DIAPHRAGM

Howard Frederick Hobbs, Leamington Spa, England, assignor to Hobbs Transmission Limited, Leamington Spa, England, a British company Application October 10, 1952, Serial No. 314,101

Claims priority, application Great Britain October 11, 1951

2 Claims. (Cl. 137—788)

This invention relates to hydraulically actuated friction clutches or brakes of the kind having relatively rotatable members, a housing carried by one of said members, friction elements carried by the housing, a friction element (e. g. a spinner plate) carried by the other of said members, a flexible diaphragm carried by the housing and by means of which the pressure of oil or other liquid in a space (which we term the liquid actuating space) provided between the housing and one side of the diaphragm is utilised for urging the diaphragm towards or through a circular opening in the housing at the other side of the diaphragm to urge the friction elements carried by the housing together to engage the other friction elements, and one or more holding plates for holding the margin or margins of the diaphragm, means being provided for supplying the oil or other liquid to the liquid actuating space when required.

We have found such clutches to give very satisfactory results. However there is a tendency for the diaphragms to be damaged and fail adjacent the circular opening. The diaphragm is generally made from rubber (or a resilient plastics material) reinforced with canvas or other textile. The circular hole is usually formed between an outer apertured holding plate and an inner circular holding plate, both plates being carried by the housing. The outer plate engages the outer margin of the diaphragm and the inner plate engages the inner margin of the diaphragm. The plates hold the peripheral margins of the diaphragm to a recessed plate carried by and forming part of the housing and forming the liquid actuating space.

According to the present invention one or each of the holding plates extends from the unclamped part of the diaphragm nearest to its adjacent periphery to a distance radially of at least three times the thickness of the diaphragm and may be six times or about four to eight times that thickness. The unclamped part may be the part adjacent to the clamped peripheral margin, or, we have found, the margin may be free (i. e. not clamped at all) in which case the unclamped part is the outer or inner periphery of the diaphragm and the margin of the diaphragm lies between the holding plate and the recessed plate without being actually clamped between them. The surface of the holding plate facing the diaphragm and between the unclamped part and the edge of the circular opening may be of frusto conical shape with the said edge furthest from the normal plane of the diaphragm, in order to provide for the minimum of bending of the diaphragm at said edge. The cone angle may be about 160 to 170 degrees. The clutch or brake may be designed so that the diaphragm as it moves from clutch-disengaged to clutch-engaged position passes through a position in which its margin is in line with the remainder of the diaphragm. If the margin of the diaphragm is clamped it may be provided with a thickened or beaded edge.

The invention will be further described by way of example with reference to the accompanying diagrammatic drawings wherein:

Figure 1 is a half sectional view of part of a clutch or brake made in accordance with the invention showing the disengaged position.

Figure 2 is a similar view but showing the engaged position; and

Figure 3:
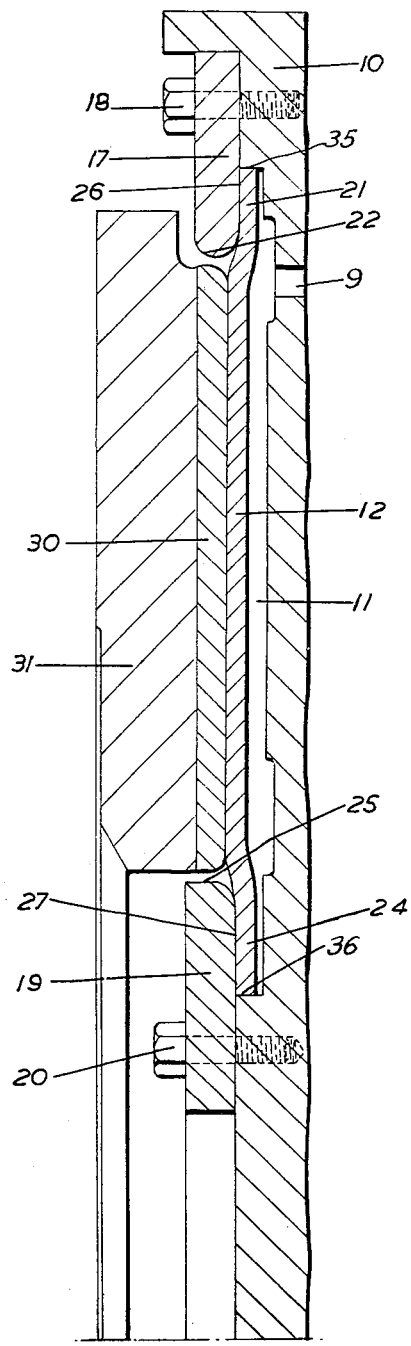
Figure 3 is a similar view but showing a modified construction.

A plate 10 is carried by a housing which in the case of a clutch is rotary and in the case of a brake is usually stationary. This plate has a ring-shaped recess 11 which can be supplied with liquid under pressure as described for example in the specification of British Patent No. 596,908. This recess is covered by a ring shaped flexible diaphragm 12 the outer periphery of which has a bead 13 engaged in a groove 14 in the plate 10 and the inner periphery of which has a bead 15 engaged in a groove 16 in the plate 10. An outer holding ring 17 is attached by bolts such as 18 to the plate 10 so as to clamp the outer beaded margin of the diaphragm to the plate 10 and an inner holding ring 19 is similarly attached to the plate 10 by bolts 20 to clamp the inner beaded margin of the diaphragm. Between the rings 17 and 19 is a circular opening containing a movable ring 30 which presses a friction ring 31 against a spinner plate (not shown).

The ring 17 extends from the unclamped part 21 of the diaphragm nearest to its adjacent (outer) periphery radially to the inner edge 22 a distance of at least three times the thickness of the diaphragm. Similarly the ring 19 extends from the unclamped part 24 of the diaphragm nearest to its adjacent (inner) periphery radially to the outer edge 25 of the ring a distance of at least three times the thickness of the diaphragm. The rings are of frusto conical shape at 26, 27, with a cone angle of about 160 to 170 degrees. The diaphragm, as it moves from the disengaged position at Figure 1 to the engaged position at Figure 2, moves through its neutral position in which its margin is in line with the remainder of the diaphragm.

As shown in Figure 3 the beads 13, 15 are omitted and the margins of the diaphragm are held loosely between the adjacent holding plates 17, 19 and the housing member 10 i. e. are not clamped between them. The ring 17 extends from the unclamped edge 35 of the diaphragm radially to the inner edge 22 a distance at least three times the thickness of the diaphragm. Similarly the ring 19 extends from 36 to 25 a distance of at least three times the thickness of the diaphragm.

In the construction of Figure 3, as in the construction of Figures 1 and 2, the rings may have frusto-conical shape at 26, 27, and the ring 19 extends from the unclamped part 24 of the diaphragm nearest to its adjacent (inner) periphery radially to the outer edge 25 of the ring a distance of at least three times the thickness of the diaphragm.

What I claim is:

1. A pressure transmitting device comprising a flexible ring diaphragm, a housing member having a ring-like depression in which said diaphragm is disposed, an opening in the housing member communicating with a space between the diaphragm and the adjacent part of the housing member, a ring-like outer holding plate located on the side of the diaphragm opposite to the depression and attached directly to the housing member in contact therewith adjacent the outer periphery of the housing member for holding the outer peripheral margin of the diaphragm in the said depression, an inner peripheral holding plate located on the same side of the diaphragm as the outer holding plate and attached directly to the housing member in contact therewith adjacent the inner periphery of the housing member for holding the inner peripheral margin of the diaphragm in said depression, movable means disposed between said outer and inner holding plates and engaging the diaphragm and movable thereby, both of said holding plates having an extending part which projects from the unclamped part of the diaphragm nearest its adjacent periphery to a distance radially of at least three times the thickness of the diaphragm, said extending part engaging the diaphragm on the side of the diaphragm remote from said space, the surfaces of both said holding plates facing the diaphragm and between the unclamped part and the adjacent periphery of the holding plate being of frusto-conical shape with said periphery furthest from the plane of the margin of the diaphragm, the housing member and said extending parts of said holding plates being spaced from the plane of the margin of the diaphragm so that the diaphragm when fluid pressure is admitted to said depression passes through a position in which its margin is in the same plane as the remainder of the diaphragm.

2. A device as claimed in claim 1 wherein at least one peripheral margin of the diaphragm is loosely held in position between the adjacent holding plate and the housing.

References Cited in the file of this patent
UNITED STATES PATENTS

| | | |
|---|---|---|
| 818,828 | Kasson | Apr. 24, 1906 |
| 1,273,534 | Pierce | July 23, 1918 |
| 1,465,431 | Gordon | Aug. 21, 1923 |
| 1,466,242 | Neal | Aug. 28, 1923 |
| 2,323,052 | Klaue | June 29, 1943 |
| 2,381,393 | Brown | Aug. 7, 1945 |
| 2,462,944 | Cardwell et al. | Mar. 1, 1949 |
| 2,487,117 | Eaton | Nov. 8, 1949 |
| 2,604,197 | Livermore | July 22, 1952 |

FOREIGN PATENTS

| | | |
|---|---|---|
| 950,819 | France | Mar. 28, 1949 |
| 980,605 | France | Dec. 27, 1950 |